United States Patent
Shibuta et al.

(10) Patent No.: US 9,642,133 B2
(45) Date of Patent: May 2, 2017

(54) COMMUNICATION APPARATUS, COMMUNICATION SYSTEM, AND COMMUNICATION METHOD

(71) Applicant: Panasonic Intellectual Property Management Co., Ltd., Osaka (JP)

(72) Inventors: Akira Shibuta, Fukuoka (JP); Hiroyuki Ishihara, Fukuoka (JP); Koichi Yamamoto, Fukuoka (JP); Katsunori Takahashi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 92 days.

(21) Appl. No.: 14/682,941

(22) Filed: Apr. 9, 2015

(65) Prior Publication Data
US 2015/0305028 A1    Oct. 22, 2015

(30) Foreign Application Priority Data

Apr. 17, 2014 (JP) .................................. 2014-085892

(51) Int. Cl.
| | | |
|---|---|---|
| *H04W 72/04* | (2009.01) | |
| *H04W 56/00* | (2009.01) | |
| *H04W 84/20* | (2009.01) | |
| *H04W 84/22* | (2009.01) | |
| *H04J 3/06* | (2006.01) | |

(52) U.S. Cl.
CPC ..... *H04W 72/0446* (2013.01); *H04W 56/001* (2013.01); *H04W 72/0406* (2013.01); *H04W 84/20* (2013.01); *H04J 3/0667* (2013.01); *H04W 84/22* (2013.01)

(58) Field of Classification Search
CPC .......... H04J 3/06; H04J 3/0638; H04J 3/0658; H04J 3/0667; H04W 56/00; H04W 72/0446; H04W 72/0406; H04W 84/22; H04W 84/20; H04W 56/001; H04B 2203/54

See application file for complete search history.

(56) References Cited

U.S. PATENT DOCUMENTS

| | | | | |
|---|---|---|---|---|
| 7,190,703 B1 * | 3/2007 | Heitmann | ........... | H04M 7/0066 370/508 |
| 2008/0175207 A1 * | 7/2008 | Lee | ......... | G06F 21/10 370/337 |

(Continued)

FOREIGN PATENT DOCUMENTS

| | | |
|---|---|---|
| JP | 2003-509973 A | 3/2003 |
| JP | 2007-124633 A | 5/2007 |
| WO | 01/20889 A1 | 3/2001 |

*Primary Examiner* — Charles C Jiang
*Assistant Examiner* — Oussama Roudani
(74) *Attorney, Agent, or Firm* — Seed IP Law Group LLP

(57) ABSTRACT

A communication apparatus is provided that can improve synchronization precision between multiple communication apparatuses. For this reason, the communication apparatus that communicates with a different communication apparatus over a network includes a slot control unit that generates multiple slots for communicating a synchronization message, and allocates each slot to the communication apparatus and the different communication apparatus; and a communication unit that communicates the synchronization message between the communication apparatus and the different apparatus, using the each slot that is allocated.

18 Claims, 11 Drawing Sheets

(56) References Cited

U.S. PATENT DOCUMENTS

2010/0142510 A1\* 6/2010 Park ............... H04W 74/04
370/345
2014/0362872 A1\* 12/2014 Grenabo ........... H04J 3/0667
370/507

\* cited by examiner

FIG. 4

|  | MESSAGE | TRANSMISSION SIDE | RECEPTION SIDE | TYPE |
|---|---|---|---|---|
| Slot0 | Sync | Master | ENTIRE Slaves | Multicast |
| Slot1 | DelayReq | Slave1 | Master | Unicast |
|  | DelayResp | Master | Slave1 | Unicast |
| Slot2 | DelayReq | Slave2 | Master | Unicast |
|  | DelayResp | Master | Slave2 | Unicast |
| Slot3 | DelayReq | Slave3 | Master | Unicast |
|  | DelayResp | Master | Slave3 | Unicast |
| ... |  |  |  |  |
| Slot98 | DelayReq | Slave98 | Master | Unicast |
|  | DelayResp | Master | Slave98 | Unicast |
| Slot99 | DelayReq | Slave99 | Master | Unicast |
|  | DelayResp | Master | Slave99 | Unicast |
| Slot0 | Sync | Master | ENTIRE Slaves | Multicast |
| Slot1 | DelayReq | Slave1 | Master | Unicast |
|  | DelayResp | Master | Slave1 | Unicast |
| Slot2 | DelayReq | Slave2 | Master | Unicast |
|  | DelayResp | Master | Slave2 | Unicast |
| Slot3 | DelayReq | Slave3 | Master | Unicast |
|  | DelayResp | Master | Slave3 | Unicast |
| ... |  |  |  |  |
| Slot98 | DelayReq | Slave98 | Master | Unicast |
|  | DelayResp | Master | Slave98 | Unicast |
| Slot99 | DelayReq | Slave99 | Master | Unicast |
|  | DelayResp | Master | Slave99 | Unicast |
| Slot0 | Sync | Master | ENTIRE Slaves | Multicast |
| Slot1 | DelayReq | Slave1 | Master | Unicast |
|  | DelayResp | Master | Slave1 | Unicast |
| ... |  |  |  |  |

TIME

FIG. 5

| | MESSAGE | TRANSMISSION SIDE | RECEPTION SIDE | TYPE |
|---|---|---|---|---|
| Slot0 | Sync | Master | ENTIRE Slaves | Multicast |
| Slot1 | DelayReq | Slave1 | Master | Unicast |
| | DelayResp | Master | Slave1 | Unicast |
| Slot2 | DelayReq | Slave2 | Master | Unicast |
| | DelayResp | Master | Slave2 | Unicast |
| Slot3 | DelayReq | Slave3 | Master | Unicast |
| | DelayResp | Master | Slave3 | Unicast |
| ... | | | | |
| Slot198 | DelayReq | Slave198 | Master | Unicast |
| | DelayResp | Master | Slave198 | Unicast |
| Slot199 | DelayReq | Slave199 | Master | Unicast |
| | DelayResp | Master | Slave199 | Unicast |
| Slot0 | Sync | Master | ENTIRE Slaves | Multicast |
| Slot1 | DelayReq | Slave1 | Master | Unicast |
| | DelayResp | Master | Slave1 | Unicast |
| Slot2 | DelayReq | Slave2 | Master | Unicast |
| | DelayResp | Master | Slave2 | Unicast |
| Slot3 | DelayReq | Slave3 | Master | Unicast |
| | DelayResp | Master | Slave3 | Unicast |
| ... | | | | |
| Slot198 | DelayReq | Slave198 | Master | Unicast |
| | DelayResp | Master | Slave198 | Unicast |
| Slot199 | DelayReq | Slave199 | Master | Unicast |
| | DelayResp | Master | Slave199 | Unicast |
| Slot0 | Sync | Master | ENTIRE Slaves | Multicast |
| Slot1 | DelayReq | Slave1 | Master | Unicast |
| | DelayResp | Master | Slave1 | Unicast |
| ... | | | | |

TIME

FIG. 6

|  | MESSAGE | TRANSMISSION SIDE | RECEPTION SIDE | TYPE |
|---|---|---|---|---|
| Slot0 | Sync | Master | ENTIRE Slaves | Multicast |
| Slot1 | DelayReq | Slave1 | Master | Unicast |
|  | DelayResp | Master | Slave1 | Unicast |
|  | DelayReq | Slave2 | Master | Unicast |
|  | DelayResp | Master | Slave2 | Unicast |
| Slot2 | DelayReq | Slave3 | Master | Unicast |
|  | DelayResp | Master | Slave3 | Unicast |
|  | DelayReq | Slave4 | Master | Unicast |
|  | DelayResp | Master | Slave4 | Unicast |
| ... |  |  |  |  |
| Slot98 | DelayReq | Slave195 | Master | Unicast |
|  | DelayResp | Master | Slave195 | Unicast |
|  | DelayReq | Slave196 | Master | Unicast |
|  | DelayResp | Master | Slave196 | Unicast |
| Slot99 | DelayReq | Slave197 | Master | Unicast |
|  | DelayResp | Master | Slave197 | Unicast |
|  | DelayReq | Slave198 | Master | Unicast |
|  | DelayResp | Master | Slave198 | Unicast |
| Slot0 | Sync | Master | ENTIRE Slaves | Multicast |
| Slot1 | DelayReq | Slave1 | Master | Unicast |
|  | DelayResp | Master | Slave2 | Unicast |
|  | DelayReq | Slave2 | Master | Unicast |
|  | DelayResp | Master | Slave2 | Unicast |
| Slot2 | DelayReq | Slave3 | Master | Unicast |
|  | DelayResp | Master | Slave3 | Unicast |
|  | DelayReq | Slave4 | Master | Unicast |
|  | DelayResp | Master | Slave4 | Unicast |
| ... |  |  |  |  |

TIME ↓

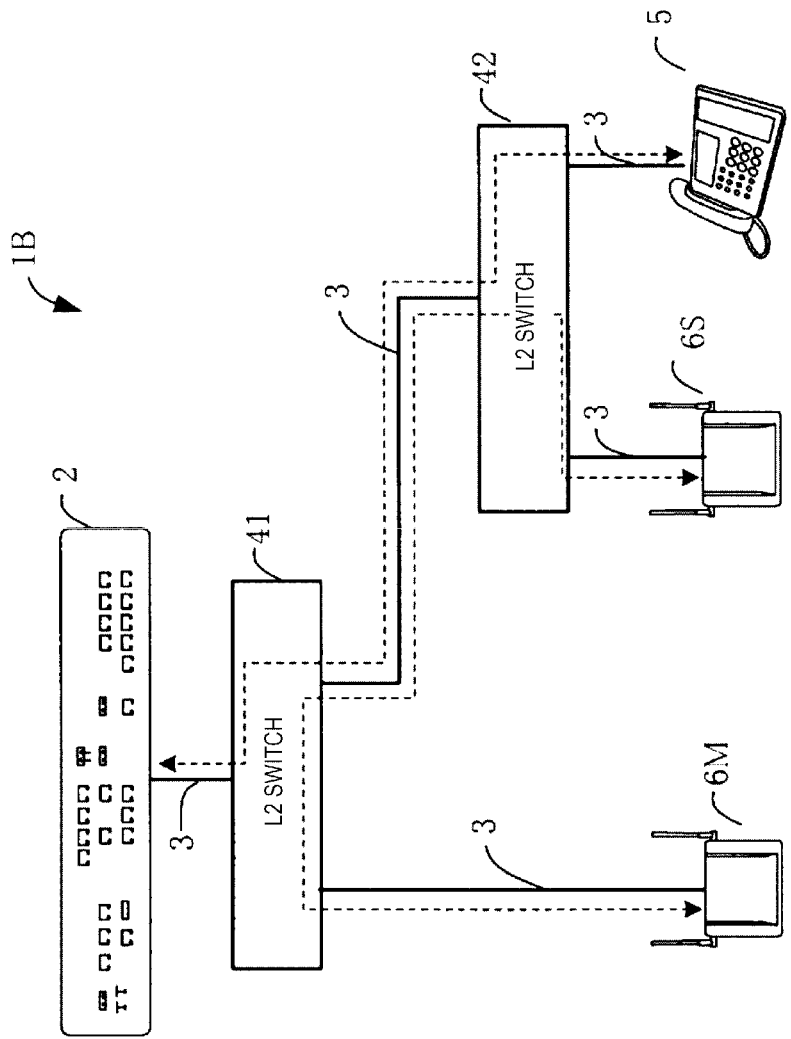

FIG. 8

| | MESSAGE | TRANSMISSION SIDE | RECEPTION SIDE | TYPE | |
|---|---|---|---|---|---|
| Slot0 | Sync | Master | ENTIRE Slaves | Multicast | × |
| Slot1 | DelayReq | Slave1 | Master | Unicast | |
| | DelayResp | Master | Slave1 | Unicast | |
| Slot2 | DelayReq | Slave2 | Master | Unicast | × |
| | DelayResp | Master | Slave2 | Unicast | |
| Slot3 | DelayReq | Slave3 | Master | Unicast | |
| | DelayResp | Master | Slave3 | Unicast | |
| ... | | | | | |
| Slot98 | DelayReq | Slave98 | Master | Unicast | × |
| | DelayResp | Master | Slave98 | Unicast | |
| Slot99 | DelayReq | Slave99 | Master | Unicast | |
| | DelayResp | Master | Slave99 | Unicast | |
| Slot0 | Sync | Master | ENTIRE Slaves | Multicast | × |
| Slot1 | DelayReq | Slave1 | Master | Unicast | |
| | DelayResp | Master | Slave1 | Unicast | |
| Slot2 | DelayReq | Slave2 | Master | Unicast | × |
| | DelayResp | Master | Slave2 | Unicast | |
| Slot3 | DelayReq | Slave3 | Master | Unicast | |
| | DelayResp | Master | Slave3 | Unicast | |
| ... | | | | | |
| Slot98 | DelayReq | Slave98 | Master | Unitcast | × |
| | DelayResp | Master | Slave98 | Unitcast | |
| Slot99 | DelayReq | Slave99 | Master | Unitcast | |
| | DelayResp | Master | Slave99 | Unitcast | |
| Slot0 | Sync | Master | ENTIRE Slaves | Multicast | × |
| Slot1 | DelayReq | Slave1 | Master | Unicast | |
| | DelayResp | Master | Slave1 | Unicast | |
| ... | | | | | |

TIME

FIG. 9

| | MESSAGE | TRANSMISSION SIDE | RECEPTION SIDE | TYPE | |
|---|---|---|---|---|---|
| Slot0 | Sync | Master | ENTIRE Slaves | Multicast | × |
| Slot1 | DelayReq | Slave1 | Master | Unicast | |
| | DelayResp | Master | Slave1 | Unicast | |
| Slot2 | DelayReq | Slave2 | Master | Unicast | |
| | DelayResp | Master | Slave2 | Unicast | |
| Slot3 | DelayReq | Slave3 | Master | Unicast | |
| | DelayResp | Master | Slave3 | Unicast | |
| Slot4 | DelayReq | Slave3 | Master | Unicast | × |
| | DelayResp | Master | Slave3 | Unicast | |
| Slot5 | DelayReq | Slave3 | Master | Unicast | |
| | DelayResp | Master | Slave3 | Unicast | |
| ... | | | | | |
| Slot97 | DelayReq | Slave3 | Master | Unicast | |
| | DelayResp | Master | Slave3 | Unicast | |
| Slot98 | DelayReq | Slave3 | Master | Unicast | × |
| | DelayResp | Master | Slave3 | Unicast | |
| Slot99 | DelayReq | Slave3 | Master | Unicast | |
| | DelayResp | Master | Slave3 | Unicast | |
| Slot0 | Sync | Master | ENTIRE Slaves | Multicast | |
| Slot1 | DelayReq | Slave1 | Master | Unicast | |
| | DelayResp | Master | Slave1 | Unicast | |
| Slot2 | DelayReq | Slave2 | Master | Unicast | × |
| | DelayResp | Master | Slave2 | Unicast | |

TIME ↓

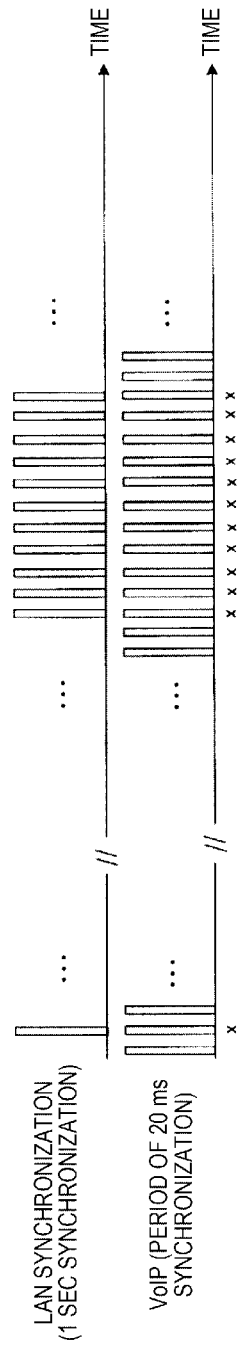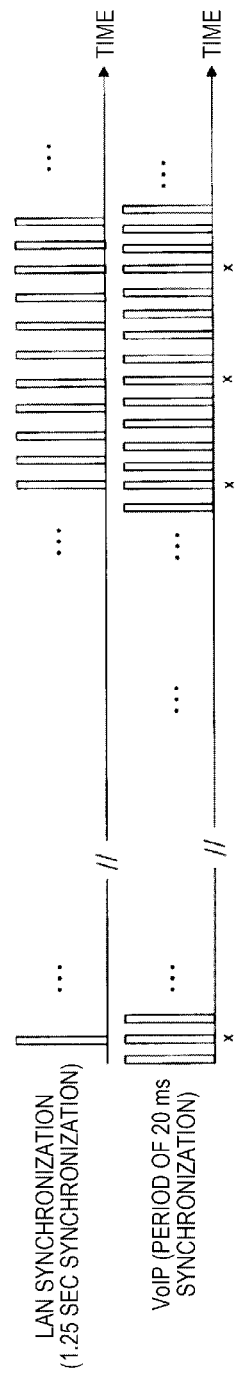

FIG.11

| | MESSAGE | TRANSMISSION SIDE | RECEPTION SIDE | TYPE | | |
|---|---|---|---|---|---|---|
| Slot0 | Sync | Master | ENTIRE Slaves | Multicast | × | |
| Slot1 | DelayReq | Slave1 | Master | Unicast | | |
| | DelayResp | Master | Slave1 | Unicast | | |
| Slot2 | DelayReq | Slave2 | Master | Unicast | × | C1 |
| | DelayResp | Master | Slave2 | Unicast | | |
| ... | | | | | | |
| Slot97 | DelayReq | Slave97 | Master | Unicast | | |
| | DelayResp | Master | Slave97 | Unicast | | |
| Slot98 | DelayReq | Slave98 | Master | Unicast | × | |
| | DelayResp | Master | Slave98 | Unicast | | |
| Slot0 | Sync | Master | | Multicast | | |
| Slot1 | DelayReq | Slave1 | Master | Unicast | × | |
| | DelayResp | Master | Slave1 | Unicast | | |
| Slot2 | DelayReq | Slave2 | Master | Unicast | | |
| | DelayResp | Master | Slave2 | Unicast | | C2 |
| ... | | | | | | |
| Slot98 | DelayReq | Slave98 | Master | Unicast | | |
| | DelayResp | Master | Slave98 | Unicast | | |
| Slot99 | − | − | − | − | × | |
| | − | − | − | − | | |
| Slot0 | Sync | Master | ENTIRE Slaves | Multicast | | |
| Slot1 | DelayReq | Slave1 | Master | Unicast | × | |
| | DelayResp | Master | Slave1 | Unicast | | |
| Slot2 | DelayReq | Slave2 | Master | Unicast | | |
| | DelayResp | Master | Slave2 | Unicast | | C3 |
| ... | | | | | | |
| Slot97 | DelayReq | Slave97 | Master | Unicast | × | |
| | DelayResp | Master | Slave97 | Unicast | | |
| Slot98 | DelayReq | Slave98 | Master | Unicast | | |
| | DelayResp | Master | Slave98 | Unicast | | |
| Slot0 | Sync | Master | ENTIRE Slaves | Multicast | × | |
| Slot1 | DelayReq | Slave1 | Master | Unicast | | |
| | DelayResp | Master | Slave1 | Unicast | | |
| Slot2 | DelayReq | Slave2 | Master | Unicast | × | |
| | DelayResp | Master | Slave2 | Unicast | | |
| Slot3 | DelayReq | Slave3 | Master | Unicast | | C4 |
| | DelayResp | Master | Slave3 | Unicast | | |
| ... | | | | | | |
| Slot98 | DelayReq | Slave98 | Master | Unicast | × | |
| | DelayResp | Master | Slave98 | Unicast | | |
| Slot99 | − | − | − | − | | |
| | − | − | − | − | | |
| Slot0 | Sync | Master | ENTIRE Slaves | Multicast | | |
| Slot1 | DelayReq | Slave1 | Master | Unicast | | |
| | DelayResp | Master | Slave1 | Unicast | | |
| ... | | | | | | |

TIME

COMMUNICATION APPARATUS, COMMUNICATION SYSTEM, AND COMMUNICATION METHOD

BACKGROUND OF THE INVENTION

1. Field of the Invention

The present invention relates to a communication apparatus, a communication system, and a communication method.

2. Description of the Related Art

In the related art, a technology has been known that relates to synchronization in a communication system.

For example, disclosed in Japanese Patent Unexamined Publication (translation of PCT application) No. 2003-509973 is a method of synchronizing multiple base stations in a mobile communication network. In this synchronization method, time information is transferred in the multiple base stations over a local area network (LAN), and a clock generator of each base station that receives the time information is adjusted based on a reception point in time and contents of the time information. Furthermore, in the synchronization method, transmission of a functional sequence relating to a radio time frame to each base station is controlled based on a signal of the clock generator.

For example, disclosed in Japanese Patent Unexamined Publication No. 2007-124633 are communication apparatuses that are connected to one another over a wireless LAN and each of which performs synchronization to the time provided by a clock means. The communication apparatus includes time means indicating the time, time detection means, first frame recognition means, and a second frame transmission means. The time detection means receives a specific first frame that is transmitted to the multiple communication apparatuses over the wireless LAN, or detects the transmission of the specific first frame. The first frame recognition means determines a first-frame detection point in time where the first frame is received or the transmission of the first frame is detected, based on a point in time that is indicated by the clock means. The second frame transmission means transmits a second frame including the first-frame detection point in time to an external communication apparatus over the wireless LAN.

Synchronization precision between the multiple communication apparatuses according to the described-above technology in the related art is not sufficiently high.

SUMMARY OF THE INVENTION

An object of the present invention is to provide a communication apparatus, a communication system, and a communication method, in which synchronization precision can be improved between multiple communication apparatuses.

According to an aspect of the present invention, there is provided a communication apparatus that communicates with a different communication apparatus over a network, the communication apparatus including: a slot control unit that generates multiple slots for communicating a synchronization message, and allocates each slot to the communication apparatus and the different communication apparatus; and a communication unit that communicates the synchronization message between the communication apparatus and the different apparatus, using the each slot that is allocated.

According to another aspect of the present invention, there is provided a communication system that performs communication between a first communication apparatus and a second communication apparatus over a network, in which the first communication apparatus includes a slot control unit that generates multiple slots for communicating a synchronization message, and allocates each slot to the first communication apparatus and the second communication apparatus, and a first communication unit that communicates the synchronization message using the each slot that is allocated, between the first communication apparatus and the second communication apparatus, and in which the second communication apparatus includes an acquisition unit that acquires information on a given slot that is allocated by the first communication apparatus to the second communication apparatus, a second communication unit that communicates the synchronization message using the given slot between the second communication apparatus and the first communication apparatus, and a clock correction unit that corrects a clock of the second communication apparatus according to the synchronization message.

According to a further aspect of the present invention, there is provided a communication method for use in a communication apparatus that communicates with a different communication apparatus over a network, the method including: generating multiple slots for communicating a synchronization message, and allocating each slot to the communication apparatus and the different communication apparatus; and communicating the synchronization message between the communication apparatus and the different apparatus, using the each slot that is allocated.

According to the present invention, the synchronization precision can be improved between the multiple communication apparatuses.

BRIEF DESCRIPTION OF DRAWINGS

FIG. 4 is a schematic diagram illustrating a first example of a time slot in a case where the synchronization processing is performed between multiple CS's according to the first embodiment;

FIG. 5 is a schematic diagram illustrating a second example of the time slot in the case where the synchronization processing is performed between multiple CS's according to the first embodiment;

FIG. 6 is a schematic diagram illustrating a third example of the time slot in the case where the synchronization processing is performed between multiple CS's according to the first embodiment;

FIG. 7 is a schematic diagram illustrating a configuration example of a communication system according to a second embodiment;

FIG. 8 is a schematic diagram illustrating an example of a packet collision in a case of using the time slot illustrated in FIG. 4;

FIG. 9 is a schematic diagram illustrating a first example of the time slot in a case where the synchronization processing is performed between multiple CS's according to the second embodiment, and an example of the packet collision in the case of using the time slot;

FIG. 10A is a schematic diagram illustrating one example of transfer timing of each packet in a case where the time slot in FIG. 8 is used;

FIG. 10B is a schematic diagram illustrating one example of the transfer timing of each packet in a case where the time slot in FIG. 9 is used; and FIG. 11 is a schematic diagram illustrating a second example of the time slot in the case where the synchronization processing is performed between multiple CS's according to the second embodiment, and the example of the packet collision in the case of using the time slot.

DETAILED DESCRIPTION OF THE PREFERRED EMBODIMENTS

Figure 1:
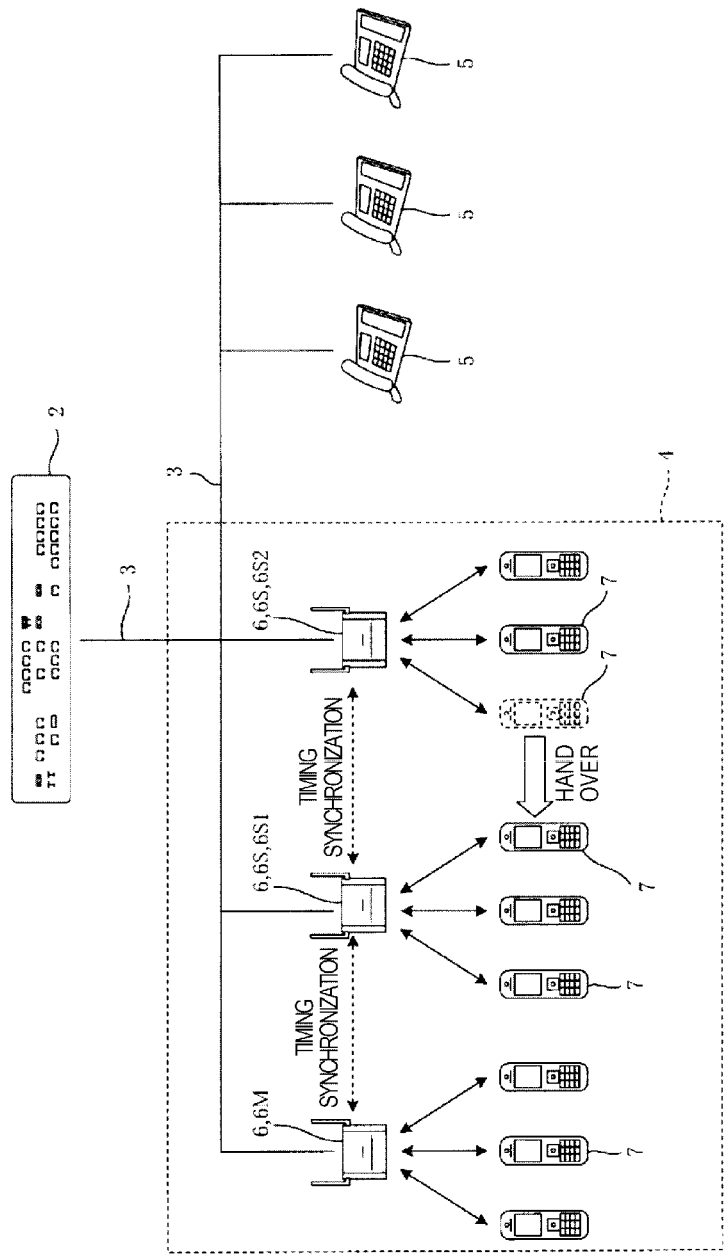
FIG. 1 is a block diagram illustrating a schematic configuration example of a communication system according to a first embodiment.

Embodiments of the present invention will be described below referring to the drawings.

A communication apparatus, a communication system, and a communication method for improving synchronization precision are described below.

A communication system according to the following embodiment, for example, is applied to an Internet Protocol (IP)-Private Branch Exchange (PBX) system.

A communication apparatus according to the following embodiment, for example, is applied to a cell station (CS) in the IP-PBX.

FIG. 1 is a schematic diagram illustrating an outlined configuration example of communication system 1 according to an embodiment. Communication system 1 includes IP-PBX main apparatus 2, IP-Digital Enhanced Cordless Telecommunication (DECT) cell system 4, and IP telephone terminal 5. IP-DECT cell system 4, for example, is connected to IP-PBX main apparatus 2 in a wired manner through LAN 3 (for example, Ethernet (a registered trade mark)). IP telephone terminal 5, for example, is connected to IP-PBX main apparatus 2 in a wired manner through LAN 3.

In an IP network, IP-PBX main apparatus 2, for example, is an apparatus that performs circuit switching of IP-DECT client terminal 7 under the control of IP telephone terminal 5 or the cell station (CS). IP-PBX main apparatus 2, for example, may be an apparatus dedicated to performing the circuit switching, and may be an all-purpose server that has the functionality of the circuit switching. An extension telephone network that is based on IP telephone, for example, can be set up with IP-PBX main apparatus 2 within a company, a store, or a call center.

IP-DECT cell system 4 has cell stations (CS) 6 as multiple base stations that make it possible for IP-DECT client terminals 7 to perform wireless communication. CS 6 includes master CS 6M that operates as a master, and slave CS 6S that operates as a slave. Master CS 6M manages synchronization of slave CS 6S. In FIG. 1, three CS's 6 are connected to LAN 3. Thus, communication between three CS's 6 and IP-PBX main apparatus 2 and communication between each CS 6 are possible. CS 6 is one example of the communication apparatus.

In FIG. 1, among the three CS's, one CS 6 is set to be CS 6M, and the other two CS's 6 are set to be slave CS's 6S1 and 6S2, respectively. It is set whether CS 6 is caused to operate as master CS 6M or as slave CS 6S, for example, by using a maintenance console of IP-PBX main apparatus 2 or by CS 6 being separately manufactured as a master-dedicated apparatus or a slave-dedicated apparatus during production. In the latter case, the number of accommodated terminals can be increased by building a high performance CPU into the master-dedicated apparatus or by setting the master-dedicated apparatus to be a synchronization master-dedicated apparatus that does not have a sound communication function.

CS's 6S1 and 6S2 as mater CS's 6M are synchronized through LAN 3 in such a manner that IP-DECT client terminal 7 performs seamless communication with CS 6M and 6S. The seamless communication, for example, indicates a handover that takes place without interruption in communication.

IP-DECT client terminal 7 is a mobile communication terminal, and, for example, performs communication (communication relating to IP telephone or voice over Internet Protocol (VoIP) communication) with CS 6 that has the strongest radio field intensity. IP-DECT client terminal 7 performs communication with CS 6 using DECT. For example, in a case where a sign that a status of communication with CS 6 that is a communication destination deteriorates is noticed together with movement of IP-DECT client terminal 7, IP-DECT client terminal 7 switches CS 6 that is the communication destination, and starts to perform communication with different CS 6. Therefore, in a case where the number of CS's 6 is great, it is possible to arrange multiple IP-DECT client terminals 7, and an area in which communication is possible can be enlarged. For example, the case where the sign that the status of communication with CS 6 deteriorates is noticed is a case where radio wave intensity or communication quality that is monitored during communication with CS 6 that is the communication destination is poor compared with communication with other neighboring CS's 6.

In FIG. 1, the number of CS's 6 in IP-DECT cell system 4 is set to 3, but is not limited to this number. However, since slave CS's 6S1 and 6S2 are synchronized to master CS 6M, the number of slave CS's 6S is equal to or smaller than that corresponding to resource capability (for example, processing capability of a CPU) of master CS 6M.

Communication system 1 includes at least multiple CS's 6.

Figure 2:
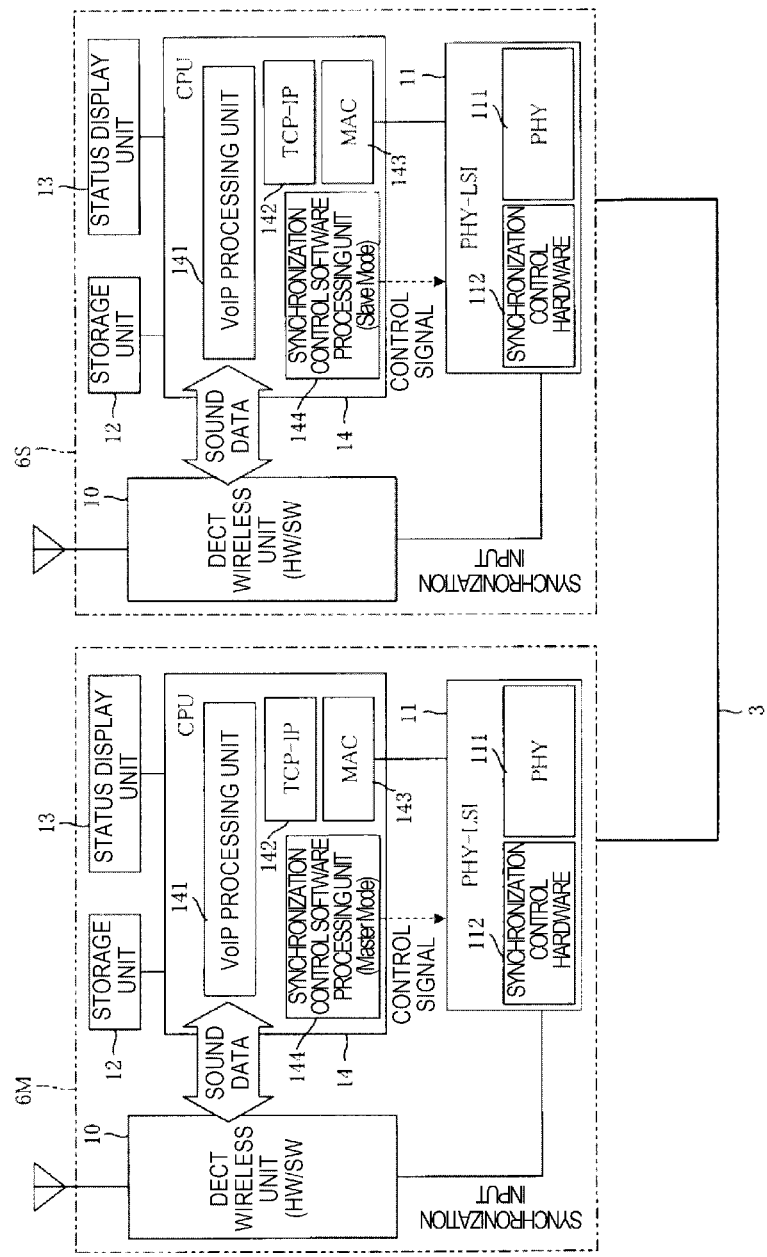
FIG. 2 is a block diagram illustrating configuration examples of a master cell station (CS) and of a slave CS according to the first embodiment.

FIG. 2 is a diagram illustrating configuration examples of master CS 6M and of slave CS 6S. As illustrated in FIG. 2, master CS 6M and slave CS 6S have the same configuration. Master CS 6M and slave CS 6S are different from each other depending on whether, in software, the cell station is set to be a master or to be a slave. In FIG. 2, master CS 6M is given as an example.

Master CS 6M has DECT wireless unit 10, a physical layer (PHY)-large scale integration (LSI) 11, storage unit 12, status display unit 13, and central processing unit (CPU) 14.

DECT wireless unit 10 includes hardware (HW) and software (SW) for performing wireless communication in accordance with a DECT scheme with IP-DECT client terminal 7. A clock signal generated by the synchronization control hardware 112 is input into DECT wireless unit 10 described below. DECT wireless unit 10 is synchronized to the clock signal for operation.

PHY-LSI 11 has PHY block 111 and synchronization control hardware 112.

PHY block 111, for example, performs processing of a PHY layer for communicating with a different VoIP apparatus over LAN 3 (for example, Ethernet (a registered trade mark)) on a voice over internet protocol (VoIP) packet. The different VoIP apparatuses, for example, include different CS 6 and IP telephone terminal 5.

Synchronization control hardware 112 includes hardware accelerator in compliance with the IEEE 1588 Ver. 2. Synchronization control hardware 112 generates a clock and has a hard function of synchronizing time information of and a clock rate of an internally-retained time stamp to a timing master in compliance with the IEEE 1588 Ver. 2 protocol. According to the present embodiment, the timing master is master CS 6M. In FIG. 2, synchronization control hardware 112 is illustrated as being included in PHY-LSI 11, but may be included in a constituent unit.

CPU 14 has VoIP processing unit 141, Transmission Control Protocol (TCP)-IP block 142, a Media Access Control (MAC) block 143, and synchronization control software processing unit 144.

VoIP processing unit 141, for example, converts bidirectional sound data received through wireless communication with IP-DECT client terminal 7 into VoIP packets. VoIP processing unit 141, for example, transmits and receives sound data to and from DECT wireless unit 10.

TCP-IP block 142 performs processing relating to a TCP layer and an IP layer for communicating with a different VoIP apparatus through LAN 3 on the VoIP packet. MAC block 143 performs processing relating to the MAC layer for communicating with a different VoIP apparatus through LAN 3 on the VoIP packet. In FIG. 2, MAC block 143 is illustrated as being included in CPU 14, but may be included in a different constituent unit.

Synchronization control software processing unit 144 controls the synchronization control hardware 112 of PHY-LSI 11, and processes software for realizing synchronization in compliance with the IEEE 1588 ver. 2 protocol. For example, CPU 14 realizes a function of synchronization control software processing unit 144 by executing a program stored in storage unit 12.

Synchronization control software processing unit 144 has two modes, that is, a master mode and a slave mode. According to the present embodiment, synchronization control software processing unit 144 of master CS 6M is set to be in the master mode, and synchronization control software processing unit 144 of slave CS 6S is set to be in the slave mode.

Synchronization control software processing unit 144, for example, performs initial setting of a CS to which synchronization control software processing unit 144 belongs, performs phase locked loop (PLL) control, and controls a clock phase of and a clock rate of the CS to which synchronization control software processing unit 144 belongs. For example, in the slave mode, synchronization control software processing unit 144 calculates a propagation delay time between synchronization control software processing unit 144 and master CS 6M based on communication of a synchronization message, and corrects a clock of the CS to which synchronization control software processing unit 144 belongs. In this case, synchronization control software processing unit 144 has a function of serving as a clock correction unit.

TCP-IP block 142, MAC block 143, and PHY block 111, for example, function as communication units that communicate the synchronization message. Storage unit 12, for example, includes a read only memory (ROM), and a random access memory (RAM). Various pieces of data, pieces of information, and programs are stored in storage unit 12.

For example, various pieces of data and pieces of information are displayed on status display unit 13.

Next, an example of communicating the synchronization message between master CS 6M and slaves CS 6S1 and 6S2 is described.

Figure 3:
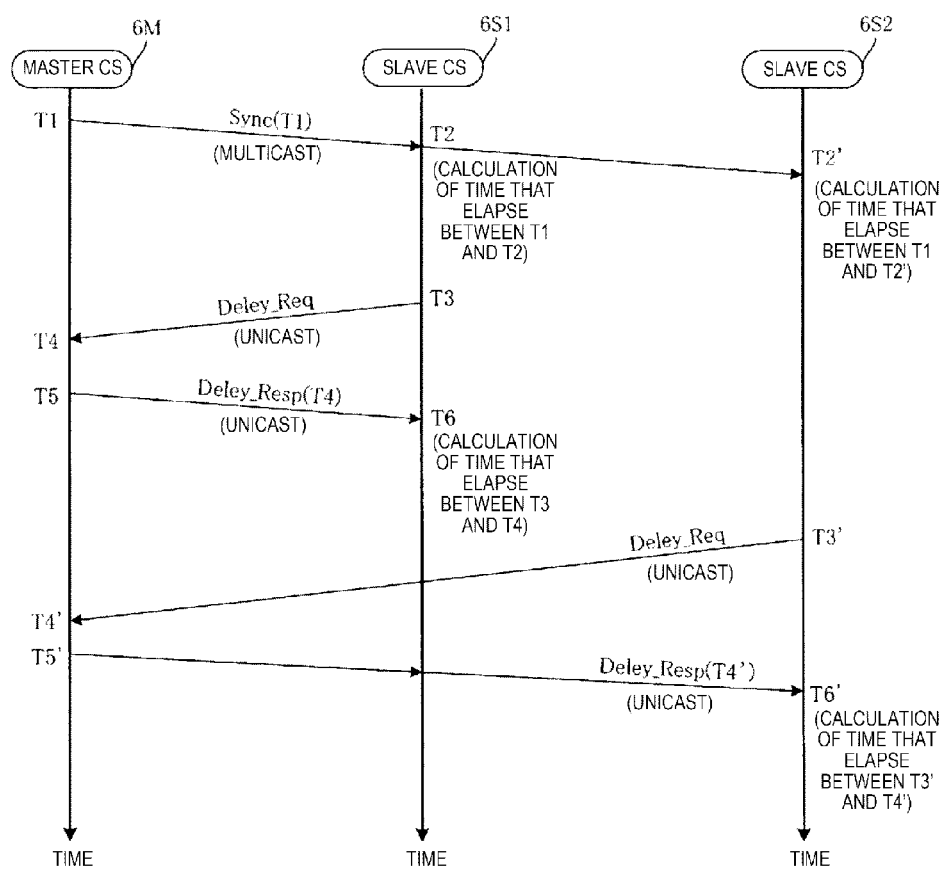
FIG. 3 is a sequence diagram illustrating one example of synchronization processing in the communication system according to the first embodiment.

FIG. 3 is a sequence diagram illustrating an example of communicating the same message between master CS 6M and slave CS's 6S1 and 6S2. In a sequence in FIG. 3, for example, the synchronization message is communicated in accordance with the IEEE 1588 Ver. 2 protocol (for example, a PTP). With the PTP, for example, the synchronization is performed in terms of time (=phase) and frequency on a packet basis. With the PTP, for example, the synchronization is performed between master CS 6M and slave CS 6S by exchanging a packet message. With the PTP, for example, a hardware time stamp is used in master CS 6M and slave CS 6S. With the PTP, for example, it is unnecessary to install a PTP-dedicated line, and coexistence with user traffic is possible.

At point T1 in time, PHY-LSI 11 of master CS 6M transmits a sync message to slave CS's 6S1 and 6S2 in a multicast manner. The sync message, for example, is transmitted in units of packets. The sync message, for example, includes information on point T1 in time where the message added by synchronization control hardware 112 of master CS 6M is transmitted. The sync message is simply described as "sync." The sync message including information on time Tx is simply expressed as sync (Tx).

At point T2 in time, PHY-LSI 11 of slave CS 6S1 receives sync (T1), and, referring to internal time stamp, acquires information on point (T2) in time where the message is received. Synchronization control software processing unit 144 of slave CS 6S1 calculates the time that elapses between T1 and T2 using the information on point T1 in time that is included in the sync message and the information on acquired point P2 in time.

At point T3 in time, PHY-LSI 11 of slave CS 6S1 transmits a Delay_Request message to master CS 6M in a unicast manner, in response to the received sync message. The Delay_Request message, for example, is transmitted in units of packets. The Delay_Request message is also simply described as "Delay_Req." PHY-LSI 11 of slave CS 6S1 acquires point T3 in time where the message is transmitted, referring to the internal time stamp, and, for example, stores acquired point T3 in time in storage unit 12.

At point T4 in time, PHY-LSI 11 of master CS 6M receives Delay_Req, and referring to the internal time stamp, acquires information on point T4 in time where the message is received.

At point T5 in time, PHY-LSI 11 of master CS 6M transmits a Delay_Response message to slave CS 6S2 in a unicast manner in response to the received Delay_Req. The Delay_Response message, for example, is transmitted in units of packets. The Delay_Response message is also simply expressed as "Delay_Resp." The Delay_Resp, for example, includes information on point T4 in time. To be more precise, PHY-LSI 11 of master CS 6M transmits Delay_Resp (T4).

At point T6 in time, PHY-LSI 11 of slave CS 6S1 receives Delay_Resp (T4), and, referring to the internal time stamp, acquires the information on point T4 in time that is included in the message. Synchronization control software processing unit 144 of slave CS 6S1 calculates the time that elapses between T3 and T4 using the information on point T4 in time that is included in Delay_Resp (T4) and the information on stored point T3 in time.

A value of a sum of a value of the calculated time that elapses between T1 and T2 and a value of the calculated time that elapses between T3 and T4 indicates the round-trip delay time between master CS 6M and slave CS 6S1. A value of half of the round-trip delay time indicates an average time of the one-way delay time, and is also referred to as the "propagation delay time." Synchronization control hardware 112 and the synchronization control software processing unit 144 of slave CS 651, for example, adjust a clock phase (=time) of and a clock rate of slave CS 6S1 in such a manner that the value of the time that elapses between T1 and T2 and the value of the time that elapses between T3-T4 are consistent with the propagation delay time. Accordingly, a clock of slave CS 6S1 can be synchronized to a clock of master CS 6M and time difference between the two clocks can be eliminated.

In the same manner, at point T2' in time, PHY-LSI 11 of slave CS 6S2 receives sync (T1), and, referring to the internal time stamp, acquires information on point T2' in time where the message is received. Synchronization control software processing unit 144 of slave CS 6S2 calculates the time that elapses between T1 and T2' using the information on point T1 in time that is included in the sync message and acquired point T2' in time.

At point T3' in time, PHY-LSI 11 of slave CS 6S2 transmits Delay_Req to master CS 6M in a unicast manner in response to the received sync message. PHY-LSI 11 of slave CS 6S2 acquires point T'3 in time where the message is transmitted, referring to the internal time stamp, and, for example, stores acquired point T3' in time in storage unit 12.

At point T4' in time, PHY-LSI 11 of master CS 6M receives Delay_Req from slave CS 6S2, and, referring to the internal time stamp, acquires information on point T4' in time where the message is received.

At point T5' in time, PHY-LSI 11 of master CS 6M transmits Delay_Response to slave CS 6S2 in a unicast manner in response to the received Delay_Req. The Delay_Resp, for example, includes the information on point T4' in time. To be more precise, PHY-LSI 11 of master CS 6M transmits Delay_Resp (T4').

At point T6' in time, PHY-LSI 11 of slave CS 6S2 receives Delay_Resp (T4'), and, referring to the internal time stamp, acquires the information on point T4' in time that is included in the message. Synchronization control software processing unit 144 of slave CS 6S2 calculates the time that elapses between T3' and T4' using the information on point T4' in time that is included in Delay_Resp (T4') and the information on stored point T3' in time.

A value of a sum of a value of the calculated time that elapses between T1 and T2' and a value of the calculated time that elapses between T3' and T4' indicates the round-trip delay time between master CS 6M and slave CS 6S2. A value of half of the round-trip delay time indicates the average time of the one-way delay time, and is also referred to as the propagation delay time. Synchronization control hardware 112 and the synchronization control software processing unit 144 of slave CS 6S2, for example, adjust a clock phase of and a clock rate of slave CS 6S2 in such a manner that the value of the time that elapses between T1 and T2' and the value of the time that elapses between T3'-T4' are consistent with the propagation delay time. Accordingly, a clock of slave CS 6S2 can be synchronized to the clock of master CS 6M, and time deviation between the two clocks can be eliminated.

As illustrated in FIG. 3, each slave CS 6S performs synchronization processing, referring to master CS 6M. Slave CS 6S performs processing for master CS 6M without performing processing for different slave CS 6S by communicating the synchronization message (for example, Delay_Req, and Delay_Resp) in a unicast manner.

In a case where the synchronization message (for example, Delay_Req and Delay_Resp) is communicated in a unicast manner, if communication timings are different from each other in unicasting communication, in master CS 6M processing each slave CS is not concentrated, or the concentration is alleviated. For this reason, a shortage (for example, a shortage of a capability of the CPU) of the resources of master CS 6M can be suppressed.

Next, a time slot in communication system 1 is described.

FIG. 4 is a schematic diagram illustrating a first example of the time slot in a case where the synchronization processing is performed between multiple CS's 6 in communication system 1. An n-th time slot is hereinafter described as "slot n." The time slot includes multiple slots for communicating the synchronization message.

Synchronization control software processing unit 144 of master CS 6M, for example, generates a time slot, and allocates one slot that is included in the time slot to each slave CS 6S. To be more precise, the synchronization control software processing unit 144 of master CS 6M has a function of serving as a slot control unit.

In slave CS 6S, PHY-LSI 11 or synchronization control software processing unit 144 acquires information on a slot allocated by master CS 6M. The information on the slot may be acquired by the communication over LAN 3, be stored in storage unit 12 that is determined in advance for each slave CS 6S, and be acquired from storage unit 12. To be more precise, PHY-LSI 11 or synchronization control software processing unit 144 of slave CS 6S has a function of serving as an acquisition unit.

With the PTP, transfer of the synchronization message (for example, Sync, Delay_Req, or Delay_Resp) illustrated in FIG. 3, for example, is repeated with a period of one second.

In FIG. 4, synchronization control software processing unit 144 of master CS 6M divides one second that is a period of the time slot by 100, and forms a time slot that includes 100 slots. To be more precise, the synchronization control software processing unit 144 of master CS 6M allocates a time of 10 msec per one slot and forms slot 0 to slot 99 that are 0-th to 99-th slots, respectively. Furthermore, the same operation is repeated with a period of one second, and slot 0 that is the 0-th slot appears after slot 99 that is the 99-th slot.

In a case where a time length per one slot is set to be 10 msec, under a specific situation (for example, a situation in which Linux (a registered trade mark) is used as an OS), mounting can be made easy. One example is to set the time length per one slot to be 10 msec, and time lengths other than 10 msec may be employed.

In FIG. 4, in slot 0, the synchronization message (sync) is communicated between master CS 6M as a master and all slave CS's 6S (6S1, 6S2, and so forth) in a multicast manner (for example, point T1 in time, point T2 in time, and point T2' in time in FIG. 3). In slot 1, the synchronization message (Delay_Req or Delay_Resp) is communicated between slave CS 6S1 as slave 1 and master CS 6M in a unicast manner (for example, refer to T3 to T6 in FIG. 3). In slot 2, the synchronization message (Delay_Req or Delay_Resp) is communicated between slave CS 6S2 as slave 2 and master CS 6M in a unicast manner (for example, refer to T3' to T6' in FIG. 3).

In the same manner, in slot 3 to slot 99, the synchronization message (Delay_Req or Delay_Resp) is communicated between slave CS (not illustrated) as slaves 3 to 99 and master CS 6M in a unicast manner. Therefore, in FIG. 4, a maximum of 99 slave CS's is allocated.

In the case of using the time slot in FIG. 4, master CS 6M can sequentially communicate the synchronization message with a given period between multiple slave CS's 6S (for example, many slave CS's 6S). Accordingly, in master CS 6M, concentration of synchronization processing for one period of time can be suppressed, and processing load on master CS 6M can be temporally distributed. Therefore, even though master CS 6M does not have a particularly high performance CPU installed therein, the occurrence of synchronization deviation between each CS 6 can be suppressed.

Each slot illustrated in FIG. 4, for example, is different from a slot in Time Division Multiple Access (TDMA), and is not under strict regulation of communication timing. Therefore, even though processing of communication of the synchronization message is not finished in one slot, the processing of communication may be continued. In this case, an influence occurs to the extent that timing where the processing of the next slot starts is somewhat delayed, the concentration of the load on master CS 6M is suppressed, and the processing load on master CS 6M is distributed.

In FIG. 4, 99-th slave CS 6S is illustrated as being allocated to slot 99 with one period. However, the maximum value of the total number of slave CS's 6S may be determined to be 98, and slot 99 may be left blank. In this case, slave CS 6S communicating the synchronization message is not allocated to slot 99. Accordingly, even though processing of each slot is delayed, the influence of the delay can be reduced in slot 99, and a delay in the starting of the processing in the next one period can be suppressed.

In FIG. 4, the number of slots is illustrated as being 100 in one period, but may be the number other than 100.

FIG. 5 is a schematic diagram illustrating a second example of the time slot in a case where the synchronization processing is performed between multiple CS's 6 in communication system 1.

In FIG. 5, as in FIG. 4, the transfer of the synchronization message (for example, Sync, Delay_Req, or Delay_Resp) is repeated with a period of one second.

In FIG. 5, synchronization control software processing unit 144 of master CS 6M divides one second that is a period of the time slot by 200, and forms a time slot that includes 200 slots. To be more precise, the synchronization control software processing unit 144 of master CS 6M allocates a time of 5 msec per one slot and forms slot 0 to slot 199. Furthermore, the same operation is repeated with a period of one second, and slot 0 appears after slot 199.

In FIG. 5, in slot 0, the synchronization message (sync) is communicated between master CS 6M and all slaves CS's 6S (6S1, 6S2, and so forth) in a multicast manner. In slot 1, the synchronization message (Delay_Req or Delay_Resp) is communicated between slave CS 6S1 and master CS 6M in a unicast manner. In slot 2, the synchronization message (Delay_Req or Delay_Resp) is communicated between slave CS 6S2 and master CS 6M in a unicast manner.

In the same manner, in slot 3 to slot 199, the synchronization message (Delay_Req or Delay_Resp) is communicated between slave CS (not illustrated) as slaves 3 to 199 and master CS 6M in a unicast manner. Therefore, in FIG. 5, a maximum of 199 slave CS's is allocated.

Therefore, even though the time slot in FIG. 5 is used, as is the case in FIG. 4, in master CS 6M, the concentration of the synchronization processing for one period of time can be suppressed, and processing load on master CS 6M can be temporally distributed. Furthermore, because the time length of each time slot is short, the number of accommodated slave CS's can be increased compared with the case in FIG. 4. For example, in a case where, as an operation system (OS) for CPU 14, a real time OS (for example, μ Itron) is employed, each slot is easy to subdivide as illustrated in FIG. 5.

As is the case in FIG. 4, the maximum value of the total number of slave CS's 6S may be determined to be 198, and slot 199 may be left blank. In this case, slave CS 6S communicating the synchronization message is not allocated to slot 199. Accordingly, even though the processing of each time slot is delayed, the influence of the delay can be reduced in slot 199, and a delay in the starting of the processing in the next one period can be suppressed.

In FIG. 5 the number of slots is illustrated as being 200 in one period, but may be a number other than 200.

FIG. 6 is a schematic diagram illustrating a third example of the time slot in the case where the synchronization processing is performed between multiple CS's 6 in communication system 1.

In FIG. 6, as in FIG. 4, the transfer of the synchronization message (for example, Sync, Delay_Req, or Delay_Resp) is repeated with a period of one second.

In FIG. 6, synchronization control software processing unit 144 of master CS 6M divides one second that is a period of the time slot by 100, and forms a time slot that includes 100 slots. To be more precise, the synchronization control software processing unit 144 of master CS 6M allocates a time of 10 msec per one slot and forms slot 0 to slot 99. Furthermore, the same operation is repeated with a period of one second, and slot 0 appears after slot 99.

In FIG. 6, in slot 0, the synchronization message (sync) is communicated between master CS 6M and all slaves CS's 6S (6S1, 6S2, and so forth) in a multicast manner. In slot 1, the synchronization message (Delay_Req or Delay_Resp) is communicated between slave CS's 6S1 and 6S2, and master CS 6M in a unicast manner. In slot 2, the synchronization message (Delay_Req or Delay_Resp) is communicated between slave CS (not illustrated) as slave 3 and slave 4 and master CS 6M in a unicast manner.

In the same manner, in slot 3 to slot 99, the synchronization message (Delay_Req or Delay_Resp) is communicated between slave CS (not illustrated) as slaves 3 to 99 and master CS 6M in a unicast manner. At this point, in one slot, consecutive two slave CS's 6S are sequentially allocated. Therefore, in FIG. 6, a maximum of 198 slave CS's 6S is allocated.

In this manner, synchronization control software processing unit 144 may allocate the same slot to multiple CS's 6.

As illustrated in FIG. 6, in a case where the communication timing of multiple slave CS's 6S is allocated to each slot, the synchronization control hardware 112 of master CS 6M may include a function of buffering the multiple time stamps.

For example, in a case where, while synchronization control software processing unit 144 performs different processing (for example, processing relating to communication of a preceding slot), a succeeding packet is received, synchronization control hardware 112 attaches a time stamp as a reception point in time to the received packet and buffers the resulting received packet. Therefore, a delay between the actual reception point in time and the time stamp can be suppressed. In a case where synchronization control software processing unit 144 finishes performing the other processing, synchronization control hardware 112 transmits the buffered packet to the synchronization control software processing unit 144.

Accordingly, the delay relating to synchronization control of multiple slave CS's 6S can be suppressed, and although the time slot is not subdivided, the number of time slots accommodated in slave CS 6S can be increased. Even though the time slot in FIG. 6 is used, in master CS 6M, the concentration of the synchronization processing for one period of time can be suppressed, and the processing load on master CS 6M can be temporally distributed.

In FIG. 6, the communication of two slot CS's 6S is illustrated as being allocated to slot 1 to slot 99 for a period of one slot, but in a case where the processing load is not excessively increased, the communication of three or more slave CS's 6S may be allocated.

According to communication system 1, for example, even though multiple slave CS's 6S are connected to master CS 6M through LAN 3, the communication timing of each slave CS 6S can be distributed for management by using the time slot. Therefore, the processing load on master CS 6M can be leveled. Furthermore, since slave CS 6 transmits slave CS 6S in a unicast manner, when compared with the multicasting transmission, the number of packets flowing through LAN 3 can be decreased and network load on LAN 3 can be leveled. Therefore, the synchronization precision between each CS 6 can be improved.

Furthermore, even though multiple slave CS's 6S (for example, many slave CS's 6S) are present, the temporary concentration of the processing for achieving synchronization in master CS 6M can be suppressed. That is, since each slave CS 6S transfers the synchronization message at different timings, the load on master CS 6M can be temporally distributed and the occurrence of the delay in the synchronization processing can be suppressed. Therefore, the synchronization precision between multiple CS's 6 can be improved.

In a case where a scheme is used in which, after a random waiting time elapses, slave CS 6 transmits Delay_Request in a unicast manner, an effect of the constant leveling of the load is obtained, however, it is difficult to accomplish the complete leveling in a case where the number of slave CS's 6 is increased. In contrast, by using the time slot, communication system 1 can distribute the concentration of the communication, and can improve the synchronization precision. Even though a handover occurs between IP-DECT client terminal 7 and each CS 6, the likelihood of call interruption occurring can be reduced by improving the synchronization precision.

Second Exemplary Embodiment

According to a second embodiment, it is assumed that packets for the synchronization message and packets for other applications are present a mixed manner in LAN 3 to which each CS 6 is connected.

FIG. 7 is a schematic diagram illustrating a configuration example of communication system 1B according to the second embodiment. Communication system 1B includes L2 switches 41 and 42 when compared with communication system 1 illustrated in FIG. 1. L2 switches 41 and 42, for example, are switching hubs that relays data over LAN 3. In communication system 1B, L2 switches 41 and 42 lie between master CS 6M and slave CS 6S.

In FIG. 7, as one portion of communication system 1B, IP-PBX main apparatus 2, one IP telephone terminal 5, two CS's 6, and two L2 switches 41 and 42 are illustrated a simplified manner. Actually, communication system 1B has the same configuration as communication system 1 according to the first embodiment, but further includes a switch. The number of apparatuses is not limited to that illustrated in FIG. 7.

In LAN 3 to which L2 switches 41 and 42 are connected, for example, packets communicated by master CS 6M and slave CS 6S and packets communicated by IP telephone terminal 5 are present in a mixed manner. For example, in a case where IP telephone terminal 5 performs communication using IP telephony, a VoIP packet occurs with a constant period (for example, 20 msec). For example, the packet for the synchronization message occurs with a period of one second.

The VoIP packet is one example of a periodic packet. The periodic packet, for example, may include an image packet. For example, in a case where a network camera (not illustrated) is connected to L2 switch 42, the image packet that is sent out by the network camera is periodically transferred over LAN 3.

For example, in a case where the VoIP packet and the packet for the synchronization message occur at the same time and both of the packets collides with each other in L2 switches 41 and 42, L2 switches 41 and 42 buffer at least one of both of the packets. Fluctuation due to the buffering occurs in the propagation delay time between master CS 6M and slave CS 651. The fluctuation in the propagation delay time causes the synchronization deviation to occur in communication system 1B. Particularly, in a case where a packet collision occurs successively, there is a likelihood that the fluctuation in the propagation delay time will increases and that the synchronization deviation will increase.

Next, a case is described where communication system 1B uses the time slot illustrated in FIG. 4. FIG. 8 is a schematic diagram illustrating an example of the packet collision in a case of using the time slot illustrated in FIG. 4.

The time length of each slot that is illustrated in FIG. 8 is 10 msec, and the time length of one time slot period including each slot is one second (1 sec). Therefore, there is a likelihood that the packet for the synchronization message will be transferred every 10 msec over LAN 3. On the other hand, it is assumed that a period with which the VoIP packet is transferred is 20 msec. In this case, there is a likelihood that the VoIP packet will be transferred every 20 msec over LAN 3. Therefore, a transfer period of the packet for the synchronization message and a period of the time slot are multiples of each other. For this reason, there is a likelihood that the packet collision will successively occur at a point in time that is marked "x" in FIG. 8.

For example, when the packet collision occurs in slot 0 as illustrated in FIG. 8, there is a likelihood that the packet collision will successively occur for every two slots. In this case, there is a likelihood that the packet collision will again occur also in slot 0 in a period of the succeeding time slot. Therefore, there is a likelihood that the packet collision will occur with high frequency each time in slots 0, 2, and so forth up to 98 and that specific slave CS 6S will fail in the synchronization message each time. Particularly, because the synchronization message that is communicated in slot 0 has an influence on the synchronization processing in each CS 6, it is desirable that the packet collision is suppressed.

In a case where L2 switches 41 and 42 buffer packets in order to avoid the packet collision, a delay occurs in L2 switches 41 and 42. For this reason, there is a likelihood that the fluctuation will occur in the propagation delay time and the synchronization deviation will occur.

FIG. 9 is a schematic diagram illustrating a first example of the time slot in a case where the synchronization processing is performed between multiple CS's 6 in communication system 1B.

In FIG. 9, a period of the time slot is different from that of the time slot in FIG. 4 and is 1.25 second. To be more precise, the same operation is repeated with a period of 1.25 second. Because the time slot in FIG. 9 is the same as the time slot illustrated in FIG. 4 except for the difference in transfer periods, descriptions of the same components as illustrated in FIG. 4 are omitted.

In FIG. 9, synchronization control software processing unit 144 of master CS 6M divides 1.25 second that is a period of the time slot by 100, and forms a time slot that includes 100 slots. To be more precise, the synchronization control software processing unit 144 of master CS 6M allocates a time of 12.5 msec per one slot and forms slot 0 to slot 99. Furthermore, the same operation is repeated with a period of 1.25 second, and slot 0 appears after slot 99.

In FIG. 9, a period of the time slot and a transfer period of the VoIP packet are multiples of each other. For this reason, the frequency with which the packet collision occurs in FIG. 9 is decreased in FIG. 9 when compared with the case in FIG. 8. In FIG. 9, a place that is marked "x" is a point in time where there is a likelihood of the packet collision occurring. For example, even though the collision of packets occurs when the sync message is transferred in slot 0, the packet collision is avoided when the succeeding synch message is transferred after 1.25 second elapses.

FIGS. 10A and 10B are schematic diagrams illustrating one example of transfer timing of each packet in a case where the time slot in FIG. 8 is used, and one example of transfer timing of each packet in a case where the time slot in FIG. 9 is used, respectively. FIG. 10A illustrates a case where the time slot in FIG. 4 is used and a case where the period of the time slot is set to be one second. FIG. 10B illustrates a case where the time slot in FIG. 9 is used and a case where the period of the time slot is set to be 1.25 second. In FIG. 10A, there is a likelihood that the packet collision will occur successively every 20 msec. In FIG. 10A, a point in time where there is a likelihood of the packet collision is indicated by a mark "x." In FIG. 10B, there is a likelihood that the packet collision will occur successively every 100 msec. In FIG. 10B, a point in time where there is a likelihood of the packet collision is indicated by a mark "x." Referring to FIGS. 10A and 10B, in a case where the period of the time slot is changed from one second to 1.25 second, it can be understood that the frequency with which the packet collision occurs is decreased to, for example, approximately one fifth.

Since the time slot in FIG. 9 is used, the period of the time slot and the transfer period of the VoIP packet are multiples of each other. That is, one of the two periods is intended to mean an integer multiple of or an integral multiple of the other. To be more precise, synchronization control software processing unit 144 may control the period of the time slot in such a manner that the period of the time slot and the transfer period of the VoIP packet are non-multiples of each other. Accordingly, the frequency with which the collision of packet occurs can be decreased when compared with the case where the period of the time slot and the transfer period of the VoIP packet are multiples of each other. For this reason, the synchronization precision can be improved in the multiple CS's 6.

FIG. 11 is a schematic diagram illustrating a second example of the time slot in a case where the synchronization processing is performed between multiple CS's 6 in communication system 1B.

In FIG. 11, the number of slots that are included in the time slot is set to 99 or 100. Synchronization control software processing unit 144 performs control in such a manner that a period of the time slot in a case where 99 slots are used and a period of the time slot in a case where 100 time slots are alternately repeated. In FIG. 11, the time length of each time slot, for example, may be 10 msec and may not be 10 msec. A period of one cycle of the time slot including 99 slots is 990 msec and a period of one cycle of the time slot including 100 slots is 1,000 msec.

In a case where the time slot in FIG. 11 is used, the frequency with which the packet collision of the VoIP packet and the packet for the synchronization message occurs with a period of 20 msec can be further decreased. For example, in FIG. 11, in initial one cycle C1 (990 msec) of the time slot, there is a likelihood that the packet collision will occur when the sync message in slot 0 is transferred. On the one hand, in one cycles C2 and C3 that follow C1, the packet collision with the VoIP packet does not occur when the sync message in slot 0 is transferred.

In FIG. 11, cycles C1 and C3 of 990 msec and cycles C2 and C4 of 1,000 msec appears alternately. Accordingly, without being limited to the VoIP packet that has a packet transfer period of 20 msec, the frequency with which the successive packet collision occurs can be decreased in various periodic packets (for example, an image packet) other than the VoIP packet and the packet for the synchronization packet.

The example is illustrated in which, as the number of slots that is included in the time slot, 99 and 100 are alternately repeated, but the number of slots may be variously changed to 3 or greater for every period of the time slot. Furthermore, the number of slots may be not only periodically changed to a constant value, but may be also changed to an arbitrary value. Furthermore, the number of slots that is included in the time slot may be changed in irregular timing, without being correspondingly changed for every period of the time slot.

By using the time slot in FIG. 11, the period of the time slot and the transfer period of the periodic packet are easy to be non-multiples of each other. To be more precise, synchronization control software processing unit 144 may control the number of slots that are included in the time slot, in such a manner that the period of the time slot and the transfer period of the VoIP are non-multiples of each other. Synchronization control software processing unit 144 may change the number of slots for every one period of the time slot. In this case, the frequency with which the packet collision occurs can be decreased when compared with the case where the period of the time slot and the transfer period of the periodic packet are always multiples of each other. For this reason, the synchronization precision can be improved in the multiple CS's 6.

According to the present embodiment, the example is illustrated in which L2 switches 41 and 42 are provided in communication system 1B, but other switches may be provided. Other switches, for example, are hardware switches in which the multicasting communication is possible, and include an L3 switch.

The present invention is not limited to the embodiments described above, and can be applied to whatever configuration can accomplish functions recited in claims, or functions performed by the configuration of each of the embodiments described above.

According to the embodiments described above, Delay_Request message and Delay_Response message are illustrated as being transmitted in an multicasting manner, but may be transmitted in a unicast manner. Even though the multicasting transmission is performed, by performing the communication using the time slot, the concentration of the message exchange in master CS 6M can be suppressed and the synchronization precision can be improved between multiple communication apparatuses.

What is claimed is:

1. A master communication apparatus comprising:
   processing circuitry which, in operation, generates multiple slots for communicating synchronization messages, and allocates the multiple slots to slave communication apparatuses, respectively, including at least first and second slave communication apparatuses; and communication circuitry which, in operation, establishes wired connections with the slave communication apparatuses, respectively; communicates to the slave communication apparatuses slot allocation information indicative of which of the multiple slots is allocated to which of the slave communication apparatuses; exchanges the synchronization messages with the first slave communication apparatus, over the wired connection, using the slot allocated to the first slave communication apparatus wherein the synchronization messages are usable for the first slave communication apparatus to correct a first internal clock; and exchanges the synchronization messages with the second slave communication apparatus, over the wired connection using the slot allocated to the second slave communication apparatus wherein the synchronization messages are usable for the second slave communication apparatus to correct a second internal clock.

2. The master communication apparatus of claim 1, wherein the processing circuitry, in operation, allocates the same slot to at least two slave communication apparatuses.

3. The master communication apparatus of claim 1, wherein, in a case where non-synchronization data is communicated in a first period, the processing circuitry sets a second period which is divided into the multiple slots such that the second period and the first period are non-multiples of each other.

4. The master communication apparatus of claim 1, wherein, in a case where non-synchronization data is communicated in a first period, the processing circuitry controls a number of the multiple slots that are included in a second period such that the second period and the first period are non-multiples of each other.

5. The master communication apparatus of claim 4, wherein the processing circuitry changes the number of the multiple slots for every cycle of the second period.

6. The master communication apparatus of claim 3, wherein the non-synchronization data includes a Voice over Internet Protocol (VoIP) packet.

7. The master communication apparatus of claim 1, wherein the communication circuitry performs communication in compliance with the IEEE 1588 standard.

8. The master communication apparatus of claim 7, wherein the synchronization messages include a sync message, a Delay_Response message, and a Delay_Request message.

9. A communication system comprising a master communication apparatus, a first slave communication apparatus and a second slave communication apparatus, wherein the master communication apparatus includes
first processing circuitry which, in operation, generates multiple slots for communicating synchronization messages, and allocates the multiple slots to the first slave communication apparatus and the second slave communication apparatus, respectively, and
first communication circuitry which, in operation, establishes wired connections with the first and second slave communication apparatuses, respectively; exchanges the synchronization messages with the first slave communication apparatus, over the wired connection, using the slot allocated, to the first slave communication apparatus; and exchanges the synchronization messages with the second slave communication apparatus, over the wired connection, using the slot allocated to the second slave communication apparatus, and wherein each of the first and second slave communication apparatuses includes
second processing circuitry which, in operation, acquires slot allocation information indicative of which of the multiple slots is allocated to which of the first and second slave communication apparatuses, and
second communication circuitry which, in operation, exchanges the synchronization messages with the master communication apparatus using the allocated slot,
wherein the second processing circuitry, in operation, corrects an internal clock according to the synchronization messages.

10. A communication method for use in a master communication apparatus that communicates with slave communication apparatuses over a network, the method comprising:
generating multiple slots for communicating synchronization messages, and allocating the multiple slots to the slave communication apparatuses, respectively, including at least first and second slave communication apparatuses;
establishing wired connections with the slave communication apparatuses, respectively;
communicating to the slave communication apparatuses slot allocation information indicative of which of the multiple slots is allocated to which of the slave communication apparatuses;
exchanging the synchronization messages with the first slave communication apparatus, over the wired connection, using the slot allocated to the first slave communication apparatus, wherein the synchronization messages are usable for the first slave communication apparatus to correct a first internal clock; and
exchanging the synchronization messages with the second slave communication apparatus, over the wired connection, using the slot allocated to the second slave communication apparatus, wherein the synchronization messages are usable for the second slave communication apparatus to correct a second internal clock.

11. The master communication apparatus of claim 4, wherein the non-synchronization data includes a Voice over Internet Protocol (VoIP) packet.

12. The master communication apparatus of claim 1, wherein a time length of the slot is extendable until exchange of the synchronization messages between the master communication apparatus and the slave communication apparatus to which said slot is allocated is completed.

13. The communication system of claim 9, wherein a time length of the slot is extendable until exchange of the synchronization messages between the master communication apparatus and the slave communication apparatus to which said slot is allocated is completed.

14. The communication system of claim 9, which is in compliance with the IEEE 1588 standard.

15. The communication method of claim 10, wherein a time length of the slot is extendable until exchange of the synchronization messages between the master communication apparatus and the slave communication apparatus to which said slot is allocated is completed.

16. The communication method of claim 10, comprising:
allocating the same slot to at least two slave communication apparatuses.

17. The communication method of claim 10, which is in compliance with the IEEE 1588 standard.

18. The communication method of claim 17, wherein the synchronization messages include a sync message, a Delay_Response message, and a Delay_Request message.

* * * * *